(12) United States Patent
Tsubaki (10) Patent No.: US 10,677,276 B2
(45) Date of Patent: Jun. 9, 2020

(54) FIXING STRUCTURE AND FIXING METHOD

(71) Applicant: Japan Display Inc., Tokyo (JP)

(72) Inventor: Yuichi Tsubaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 493 days.

(21) Appl. No.: 15/155,793

(22) Filed: May 16, 2016

(65) Prior Publication Data

US 2016/0356295 A1 Dec. 8, 2016

(30) Foreign Application Priority Data

Jun. 8, 2015 (JP) .................................. 2015-115948

(51) Int. Cl.
*F16B 5/02* (2006.01)
*F16B 5/06* (2006.01)

(52) U.S. Cl.
CPC .......... *F16B 5/0275* (2013.01); *F16B 5/0642* (2013.01)

(58) Field of Classification Search
CPC .............................. F16B 5/0275; F16B 5/0642
See application file for complete search history.

(56) References Cited

U.S. PATENT DOCUMENTS

| 7,585,463 | B2 * | 9/2009 | Austin | G01N 35/1011 |
| | | | | 422/63 |
| 9,116,374 | B2 * | 8/2015 | Nishimoto | G02F 1/133308 |
| 9,231,339 | B1 * | 1/2016 | Stier | H01R 4/44 |
| 2006/0268497 | A1 | 11/2006 | Shin | |

FOREIGN PATENT DOCUMENTS

| CN | 202501421 | | 10/2012 |
| CN | 203134928 | | 8/2013 |
| CN | 203814096 | | 9/2014 |
| JP | S35-6455 | | 4/1935 |
| JP | S52-095061 | | 1/1951 |
| JP | S54-040464 | | 3/1979 |
| JP | 2-54908 | | 4/1990 |
| JP | 09000355 | * | 1/1997 |
| JP | 2006-330703 | | 12/2006 |
| JP | 2014-116554 | | 6/2014 |

(Continued)

OTHER PUBLICATIONS

Japanese Office Action dated Dec. 18, 2018 in corresponding Japanese Application No. 2015-115948.

(Continued)

*Primary Examiner* — John C Hong
(74) *Attorney, Agent, or Firm* — K&L Gates LLP (57) ABSTRACT

According to an aspect, a fixing structure includes: a supporting plate; a substrate arranged on a first surface of the supporting plate, the substrate including a component that is arranged on a surface opposite to the supporting plate and projects toward opposite to the supporting plate; a male screw that is fixed to the supporting plate so that a first end projects from the first surface to pass through the substrate, and a second end opposite to the first end does not project from a second surface opposite to the first surface of the supporting plate; and a female screw that is screwed with the first end of the male screw projecting from the substrate.

10 Claims, 6 Drawing Sheets

(56) References Cited

FOREIGN PATENT DOCUMENTS

JP      2014116554    *   6/2014
KR     10-0732949        6/2007

OTHER PUBLICATIONS

Chinese Office Action dated Jan. 22, 2019 in corresponding Chinese Application No. 201610394220.0.
Japanese Office Action dated Jun. 25, 2019 in corresponding Japanese Application No. 2015-115948.
Chinese Office Action dated May 29, 2019 in corresponding Chinese Application No. 201610394220.6.

* cited by examiner

FIXING STRUCTURE AND FIXING METHOD

CROSS-REFERENCE TO RELATED APPLICATIONS

This application claims priority from Japanese Application No. 2015-115948, filed on Jun. 8, 2015, the contents of which are incorporated by reference herein in its entirety.

BACKGROUND

1. Technical Field

The present invention relates to a fixing structure and a fixing method.

2. Description of the Related Art

As a method for fixing a substrate on which a component is mounted to a supporting plate, screw clamp is known. In this method, first, a substrate is arranged on a first surface of the supporting plate so that a surface on the component side faces the opposite direction to the supporting plate, and a male screw is inserted from the substrate side. A distal end of the male screw is screwed into a female screw arranged on a second surface of the supporting plate. To firmly fix the supporting plate to the substrate, a drawing, a burring part, or the like is formed on the second surface of the supporting plate (for example, refer to Japanese Patent Application Laid-open Publication No. 2014-116554).

In the method described above, a projection corresponding to at least the height of the female screw is formed on the second surface of the supporting plate. The projection may be disadvantageous for a device that is required to be thinner, such as a liquid crystal module. For example, in a case of fixing the substrate to a back side of the supporting plate supporting a bottom of a backlight, luminance distribution of the backlight becomes nonuniform when the projection abuts on the backlight, so that the backlight cannot be brought into close contact with the supporting plate. Due to this, the thickness of the module increases.

SUMMARY

According to an aspect, a fixing structure includes: a supporting plate; a substrate arranged on a first surface of the supporting plate, the substrate including a component that is arranged on a surface opposite to the supporting plate and projects toward opposite to the supporting plate; a male screw that is fixed to the supporting plate so that a first end projects from the first surface to pass through the substrate, and a second end opposite to the first end does not project from a second surface opposite to the first surface of the supporting plate; and a female screw that is screwed with the first end of the male screw projecting from the substrate.

According to an aspect, a fixing method includes: fixing a male screw to a supporting plate, and causing a first end of the male screw to project from a first surface of the supporting plate; arranging a substrate on the first surface, the substrate including a component that is arranged on a surface opposite to the supporting plate and projects toward opposite to the supporting plate, and causing the first end of the male screw to pass through the substrate; and causing a female screw to be screwed with the first end of the male screw projecting from the substrate. At the fixing, the male screw is fixed to the supporting plate so that a second end opposite to the first end of the male screw does not project from a second surface opposite to the first surface of the supporting plate.

DETAILED DESCRIPTION

The following describes an embodiment in detail with reference to the drawings. The present invention is not limited to the embodiment described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

Figure 1:
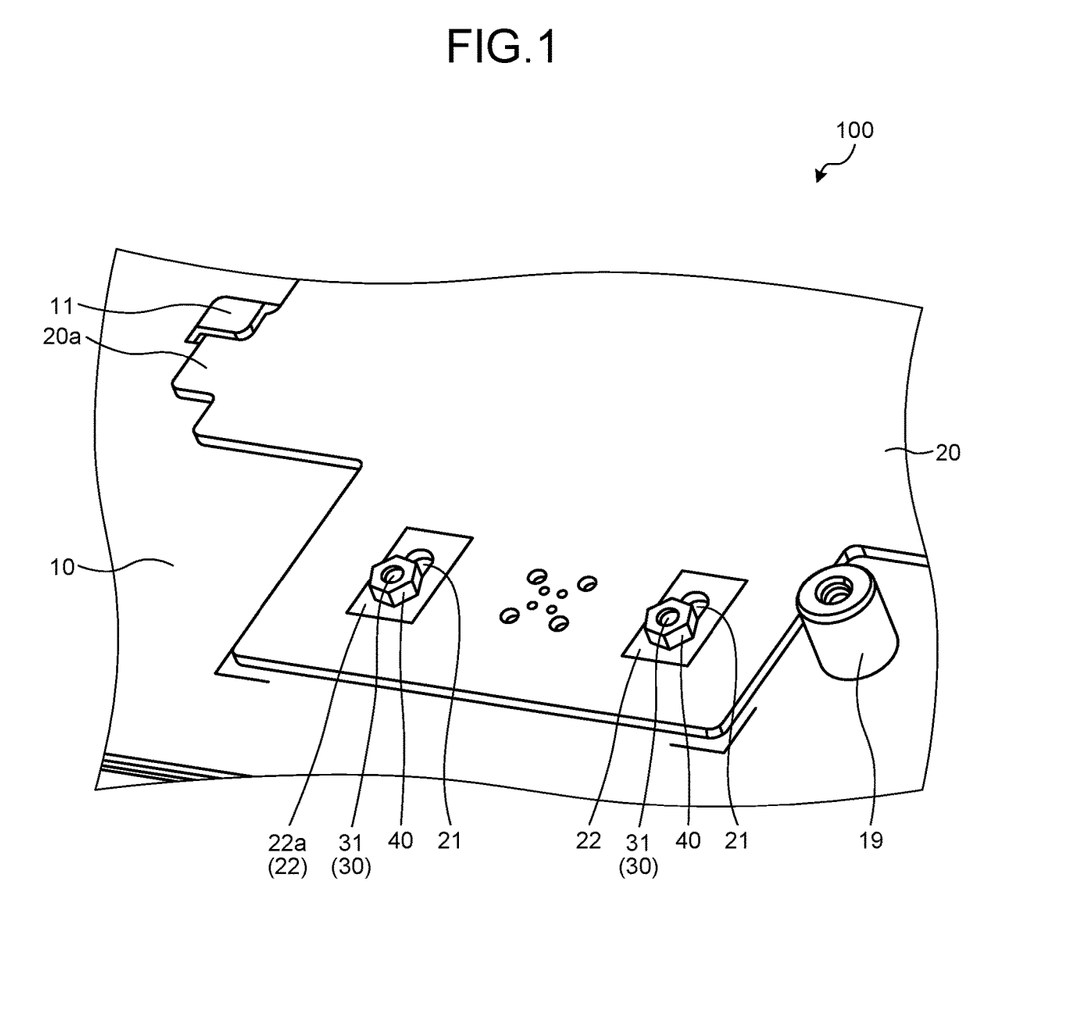
FIG. 1 is a perspective view of a fixing structure in which a supporting plate is fixed to a substrate.
Figure 2:
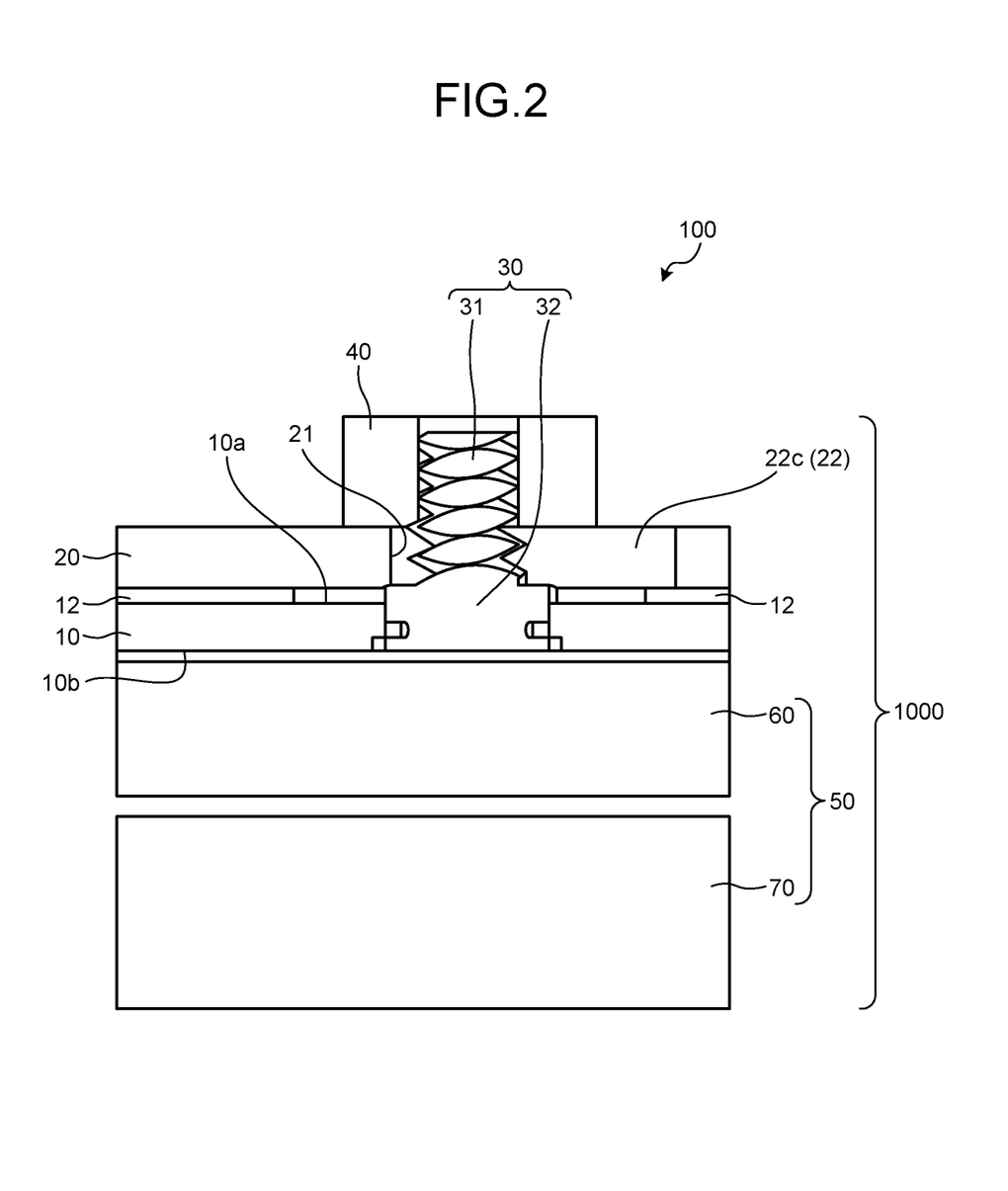
FIG. 2 is a cross-sectional view of the fixing structure.
Figure 3:
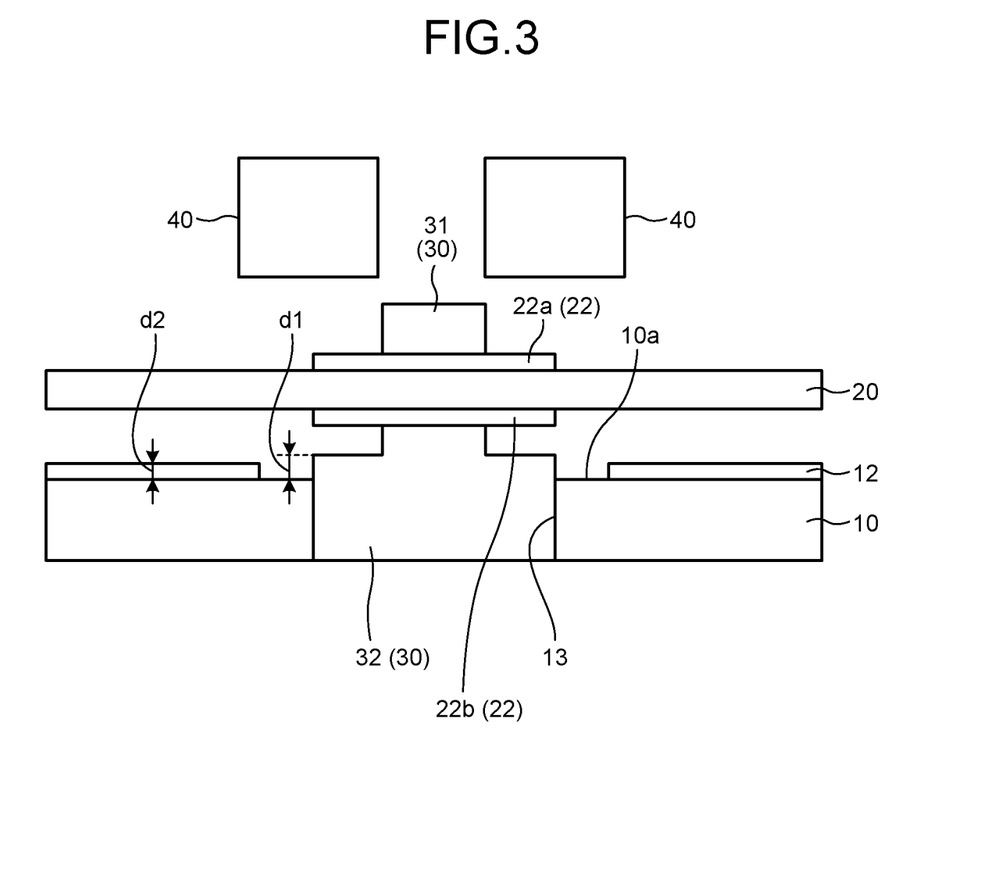
FIG. 3 is a cross-sectional view illustrating a state before the supporting plate is fixed to the substrate.
Figure 4:
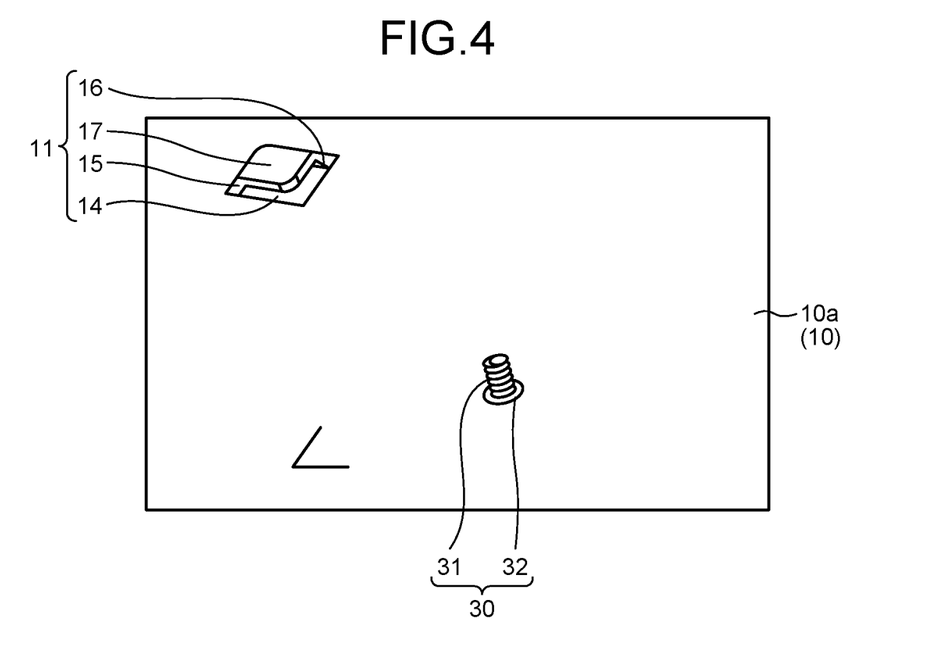
FIG. 4 is an explanatory diagram of a fixing method for fixing the supporting plate to the substrate.
Figure 5:
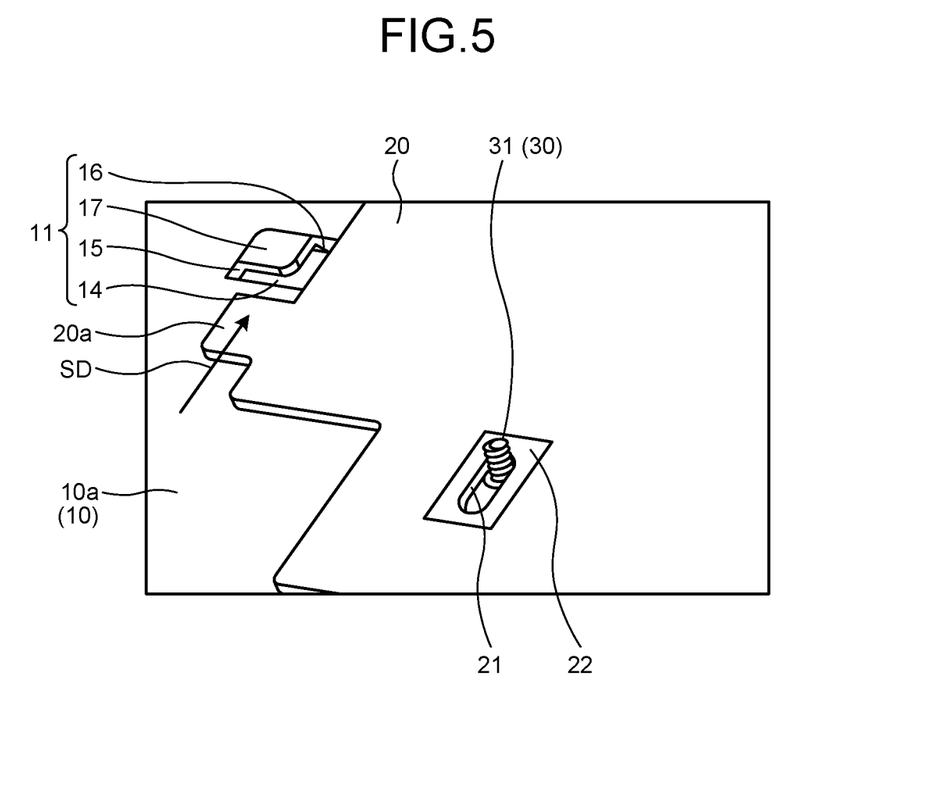
FIG. 5 is an explanatory diagram of the fixing method for fixing the supporting plate to the substrate.
Figure 6:
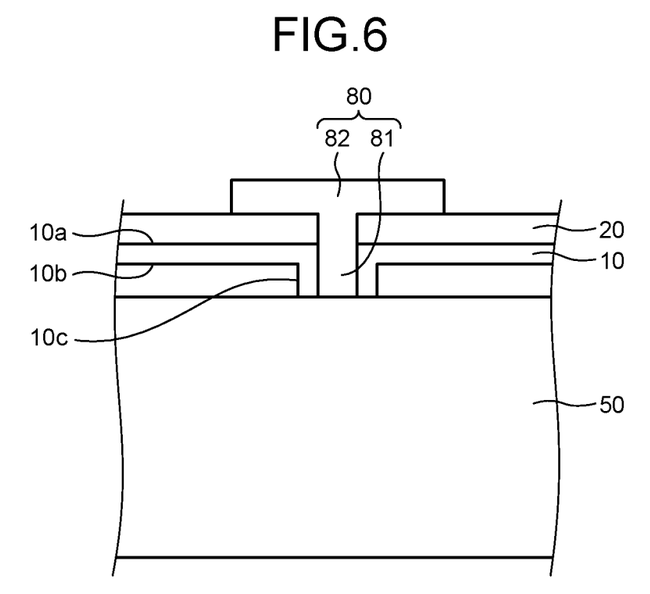
FIG. 6 is a diagram illustrating a fixing structure according to a comparative example.
Figure 7:
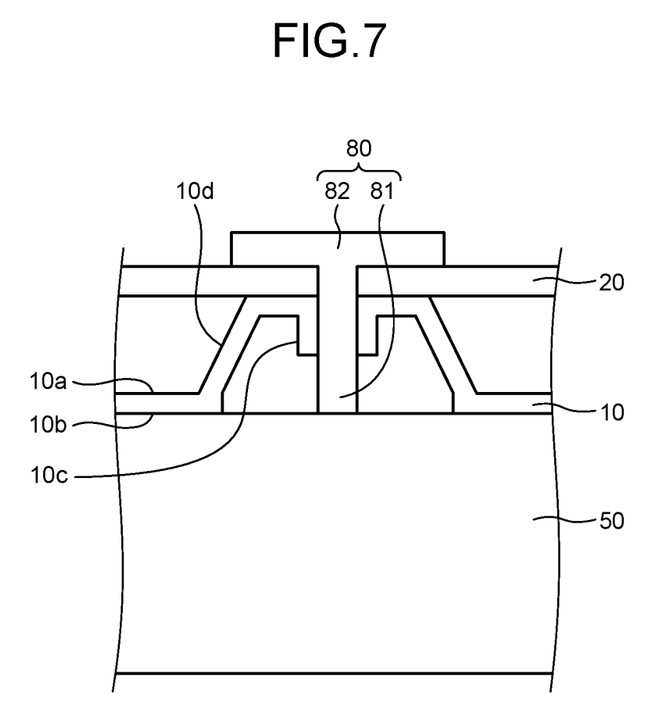
FIG. 7 is a diagram illustrating a fixing structure according to a comparative example.
Figure 8:
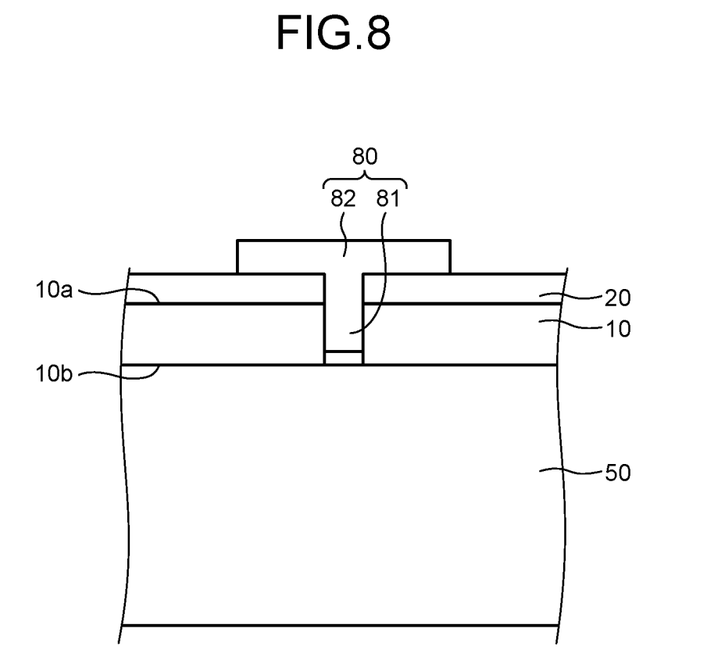
FIG. 8 is a diagram illustrating a fixing structure according to a comparative example.

FIG. 1 is a perspective view of a fixing structure 100 of a supporting plate 10 and a substrate 20. FIG. 2 is a cross-sectional view of the fixing structure 100. FIG. 3 is a cross-sectional view illustrating a state before the supporting plate 10 is fixed to the substrate 20. FIGS. 4 and 5 are explanatory diagrams of a fixing method for the supporting plate 10 and the substrate 20. FIGS. 6 to 8 are diagrams illustrating the fixing structure according to comparative examples.

As illustrated in FIGS. 1 to 3, the fixing structure 100 includes the supporting plate 10, the substrate 20, a male screw 30, and a female screw 40. The supporting plate 10 is, for example, a back lid of a case housing an electronic device 50. The substrate 20 is electrically coupled to the electronic device 50 via a flexible printed circuit board (not illustrated). The electronic device 50 includes, for example, a liquid crystal panel 70 and a backlight 60. The substrate 20 is arranged on a first surface 10a of the supporting plate 10. The substrate 20 is, for example, a printed circuit board on which a plurality of components are mounted. On a surface of the substrate 20 opposite to the supporting plate 10, a component projecting toward opposite to the supporting plate 10 (a stud 19 for attaching an external housing, an interface connecter, or the like) is arranged. The electronic device 50 is supported on a second surface 10b (a surface opposite to the first surface 10a) of the supporting plate 10.

A device module 1000 is formed of the electronic device 50, the supporting plate 10, the substrate 20, the male screw 30, and the female screw 40.

The male screw 30 has a first end 31 on which a screw groove is formed and a second end 32 thicker than the first end 31. The male screw 30 is, for example, pressed into a through hole 13 arranged on the supporting plate 10 from the second surface 10*b* side of the supporting plate 10. The male screw 30 is fixed to the supporting plate 10 so that the first end 31 projects from the first surface 10*a* to pass through the substrate 20, and the second end 32 opposite to the first end 31 does not project from the second surface 10*b* opposite to the first surface 10*a* of the supporting plate 10. For example, a projection and a depression are formed on an outer peripheral surface of the second end 32. Due to this, when the second end 32 is pressed into the through hole 13, an inner wall surface of the through hole 13 is deformed, and the second end 32 hardly comes off from the through hole 13. The female screw 40 is screwed with the first end 31 of the male screw 30 projecting from the substrate 20. The height of the first end 31 and the female screw 40 projecting from an upper surface of the substrate 20 is, for example, lower than the height of the component arranged on the upper surface of the substrate 20.

As illustrated in FIGS. 4 and 5, a claw part 11 is arranged on the first surface 10*a*. The substrate 20 is fitted into the claw part 11 by being slid in a first direction SD parallel with the first surface 10*a*. The substrate 20 includes, for example, a projecting part 20*a* that projects from an edge of the substrate 20 parallel with the first direction SD in a second direction orthogonal to the first direction SD. The projecting part 20*a* of the substrate 20 is fitted into the claw part 11. The substrate 20 includes a through hole 21 elongated in the first direction SD. The first end 31 of the male screw 30 passes through the through hole 21 to project from the substrate 20.

The claw part 11 includes a slide hole 14 in which the substrate 20 is slid in the first direction SD and a receiving part 16 that is brought into contact with the substrate 20 in the slide hole 14 to stop movement of the substrate 20 in the first direction SD. The claw part 11 also includes a guiding part 15 that is brought into contact with a side surface of the substrate 20 parallel with the first direction SD to guide the movement of the substrate 20 in the first direction SD, and a holding part 17 for holding the upper surface of the substrate 20 in the slide hole 14. The claw part 11 is arranged at a position distant from, in the first direction SD, a position at which the first end 31 of the male screw 30 is arranged.

As illustrated in FIGS. 1 to 3, the substrate 20 includes a grounding part 22 fixed at a ground potential. The supporting plate 10 is electrically coupled to the grounding part 22 via the male screw 30 and the female screw 40. The grounding part 22 is arranged on any one or both of the upper surface (the surface opposite to the supporting plate 10) and a lower surface (a surface on the supporting plate 10 side) of the substrate 20. In FIG. 3, for example, a ground pattern is continuously formed on the upper surface and the lower surface of the substrate 20 and an inner wall surface of the through hole 21 by plating with gold and the like to provide the grounding part 22 across the upper surface and the lower surface of the substrate 20.

The female screw 40 is electrically coupled to a first grounding part 22*a* arranged on the surface of the substrate 20 opposite to the supporting plate 10. The second end 32 of the male screw 30 projects from the first surface 10*a* toward the substrate 20, and is electrically coupled to a second grounding part 22*b* arranged on the surface of the substrate 20 on the supporting plate 10 side. The first grounding part 22*a* is electrically coupled to the second grounding part 22*b* via a ground pattern (third grounding part 22*c*) arranged on the inner wall surface of the through hole 21. The substrate 20 and the supporting plate 10 are grounded via the grounding part 22.

As illustrated in FIGS. 2 and 3, an insulating film 12 is arranged between the supporting plate 10 and the substrate 20. A height d1 by which the second end 32 of the male screw 30 projects from the first surface 10*a* of the supporting plate 10 is the same as or slightly larger than a thickness d2 of the insulating film 12.

The supporting plate 10 is fixed to the substrate 20 using the following method.

First, as illustrated in FIG. 4, the male screw 30 is fixed to the supporting plate 10, and the first end 31 of the male screw 30 is caused to project from the first surface 10*a* of the supporting plate 10 (first step). For example, the male screw 30 is inserted into the through hole 13 arranged on the supporting plate 10 from the second surface 10*b* (refer to FIG. 3) side of the supporting plate 10, and the first end 31 is pushed to a position not projecting from the second surface 10*b*. The size of the through hole 13 is slightly smaller than that of the first end 31, so that the through hole 13 is slightly widened when the first end 31 is pushed (pressed) into the through hole 13. Accordingly, the male screw 30 is firmly fixed to the supporting plate 10. At the first step, the male screw 30 is fixed to the supporting plate 10 so that the second end 32 opposite to the first end 31 of the male screw 30 does not project from the second surface 10*b* opposite to the first surface 10*a* of the supporting plate 10.

Next, as illustrated in FIG. 5, the substrate 20 is arranged on the first surface 10*a*, the substrate 20 including a component (such as the stud 19 for attaching an external housing (refer to FIG. 1)) that is arranged on the surface thereof opposite to the supporting plate 10 and projects toward opposite to the supporting plate 10, and the first end 31 of the male screw 30 is caused to pass through the substrate 20 (second step). In this case, first, the first end 31 is inserted into the through hole 21 of the substrate 20. The through hole 21 is formed to be elongated in the first direction SD, and the first end 31 is inserted into an end on the first direction SD side of the through hole 21. Next, the substrate 20 is slid in the first direction SD in a state in which the first end 31 is inserted into the through hole 21. At this point, the projecting part 20*a* of the substrate 20 is inserted into the slide hole 14 to be slid along the guiding part 15 to a position where the projecting part 20*a* is brought into contact with the receiving part 16. Accordingly, the projecting part 20*a* is fitted into the claw part 11, and the substrate 20 is positioned on the supporting plate 10.

Next, as illustrated in FIG. 1, the female screw 40 is screwed with the first end 31 of the male screw 30 projecting from the substrate 20 (third step). The grounding part 22 is exposed around the through hole 21, and the supporting plate 10 and the grounding part 22 are short-circuited when the male screw 30 and the female screw 40 are brought into contact with the grounding part 22. Accordingly, the substrate 20 and the supporting plate 10 are mechanically and electrically coupled to each other. The substrate 20 is supported by the claw part 11 from the first direction SD. Thus, for example, when the device module 1000 (refer to FIG. 2) is used while positioning the claw part 11 on a vertically lower side than the male screw 30 and the female screw 40, the substrate 20 is supported by the claw part 11 from the vertically lower side. Accordingly, when the structure described above is applied to the device module 1000 to be mounted on a vehicle, which is largely vibrated in actual use, the substrate 20 is effectively prevented from coming off from the supporting plate 10.

In the fixing structure 100 and the fixing method according to the embodiment described above, the first end 31 of the male screw 30 does not project from the second surface 10b of the supporting plate 10. Thus, the electronic device 50 can be brought into close contact with the second surface 10b of the supporting plate 10. An extra space is not required to be provided between the supporting plate 10 and the electronic device 50, so that the thickness of the device module 1000 as a whole including the electronic device 50, the supporting plate 10, and the substrate 20 is reduced.

For example, in the fixing structure in the related art illustrated in FIGS. 6 and 7, an extra space is formed between the supporting plate 10 and the electronic device 50 or between the supporting plate 10 and the substrate 20, so that the thickness of the device module is increased.

In a first comparative example illustrated in FIG. 6, a burring part 10c is provided to the second surface 10b of the supporting plate 10 to perform screw clamp. In this structure, the burring part 10c projects toward the electronic device 50, so that an extra gap is formed between the supporting plate 10 and the electronic device 50. In a second comparative example illustrated in FIG. 7, a drawing 10d is provided to the first surface 10a of the supporting plate 10 to perform screw clamp. In this structure, the drawing 10d projects toward the substrate 20, so that an extra gap is formed between the supporting plate 10 and the substrate 20.

In the fixing structure (a third comparative example) illustrated in FIG. 8, the electronic device 50, the supporting plate 10, and the substrate 20 are in close contact with each other. However, to perform screw clamp without using the burring part and the like, the thickness of the supporting plate 10 is required to be increased. Thus, the thickness of the device module as a whole increases.

In all of the three comparative examples described above, a male screw 80 is inserted from the substrate 20 side. Thus, a distance from the upper surface of the substrate 20 to the electronic device 50 is determined depending on a length of a first end 81 of the male screw 80 (a length of a portion other than a second end 82 projecting from the upper surface of the substrate 20). Accordingly, the thickness of the device module is also determined depending on the length of the first end 81.

In the present embodiment, the male screw 30 is inserted from the supporting plate 10 side, and the second end 32 of the male screw 30 is embedded within the supporting plate 10. Thus, the distance between the upper surface of the substrate 20 and the electronic device 50 is determined depending on thicknesses of the supporting plate 10 and the substrate 20 regardless of the length of the first end 31. Accordingly, the thickness of the device module is reduced as compared with that of the comparative examples.

In the present embodiment, although the first end 31 and the female screw 40 project from the upper surface of the substrate 20, the component having a large height (the stud 19 for attaching an external housing (refer to FIG. 1), an interface connecter, or the like) is originally arranged on the upper surface of the substrate 20. Accordingly, even if the first end 31 and the female screw 40 project therefrom, the thickness of the substrate 20 as a whole including the stud 19 for attaching an external housing and the like is not largely changed. Thus, the first end 31 and the female screw 40 projecting from the upper surface of the substrate 20 do not largely affect the thickness of the device module 1000.

The preferred embodiment of the present invention has been described above. However, the present invention is not limited thereto. Content disclosed in the embodiment is merely an example, and various modifications can be made without departing from the gist of the invention. The present invention naturally encompasses an appropriate modification maintaining the gist of the invention. The present invention also encompasses any invention that can be implemented by those skilled in the art by appropriately modifying design of the invention described above while maintaining the gist of the invention.

For example, in the above embodiment, the second end 32 is pressed into the through hole 13 to fix the male screw 30 to the supporting plate 10. However, the method for fixing the male screw 30 to the supporting plate 10 is not limited thereto. For example, the male screw 30 may be fixed to the supporting plate 10 by welding the second end 32 to the supporting plate 10 in a state in which the second end 32 is inserted into the through hole 13.

What is claimed is:

1. A fixing structure comprising:
   a supporting plate having a first surface and a second surface opposite to the first surface, an electronic device being supported on the second surface;
   a substrate arranged on the first surface of the supporting plate, the substrate having an outer surface opposite to the supporting plate;
   a male screw having a first end and a second end opposite to the first end, a width of the second end being larger than a width of the first end, wherein the male screw is fixed to the supporting plate so that a first end projects from the first surface to pass through the substrate toward an outer side opposite to the electronic device and so that the second end does not project from the second surface on which the electronic device is supported; and
   a female screw that is screwed with the first end of the male screw projecting from the substrate,
   wherein a distance between the outer surface of the substrate and the electronic device is determined depending on a combined thickness of a thickness of the supporting plate and a thickness of the substrate, in a direction perpendicular to the substrate, regardless of a length of the first end of the male screw.

2. The fixing structure according to claim 1, further comprising a claw part arranged on the first surface, to which the substrate is fitted in by sliding the substrate in a first direction parallel with the first surface.

3. The fixing structure according to claim 2, wherein
   the substrate includes a through hole elongated in the first direction, and
   the first end of the male screw passes through the through hole to project from the substrate.

4. The fixing structure according to claim 3, wherein the claw part includes a slide hole that slides the substrate in the first direction, and a receiving part that is brought into contact with the substrate within the slide hole and stops movement of the substrate in the first direction.

5. The fixing structure according to claim 4, wherein the claw part is arranged at a position distant from, in the first direction, a position at which the first end of the male screw is arranged.

6. The fixing structure according to claim 1, wherein the female screw is electrically coupled to a first grounding part arranged on a surface of the substrate opposite to the supporting plate.

7. The fixing structure according to claim 1, wherein the second end of the male screw projects toward the substrate from the first surface, and is electrically coupled to a second grounding part arranged on a surface of the substrate on the supporting plate side.

8. The fixing structure according to claim 7, wherein the male screw is pressed into a through hole arranged on the supporting plate in a direction from the second surface on which an electric device is supported, to the first surface of the supporting plate.

9. The fixing structure according to claim 1, wherein the electronic device electrically coupled to the substrate is supported on the second surface of the supporting plate.

10. A fixing method comprising:

fixing a male screw that has a first end and a second end opposite to the first end to a supporting plate that has a first surface and a second surface opposite to the first surface, an electronic device being supported on the second surface, and causing the first end of the male screw to project from the first surface of the supporting plate toward an outer side opposite to the electronic device;

arranging a substrate on the first surface, the substrate having an outer surface opposite to the supporting plate, and causing the first end of the male screw to pass through the substrate;

and causing a female screw to be screwed with the first end of the male screw projecting from the substrate, wherein at the fixing, the male screw is fixed to the supporting plate so that the second end having a width larger than a width of the first end does not project from the second surface on which the electronic device is supported, and a distance between the outer surface of the substrate and the electronic device is determined depending on a combined thickness of a thickness of the supporting plate and a thickness of the substrate, in a direction perpendicular to the substrate, regardless of a length of the first end of the male screw.

* * * * *